United States Patent
Frank et al.

(10) Patent No.: US 9,083,206 B2
(45) Date of Patent: Jul. 14, 2015

(54) DEVICE AND METHOD FOR DAMPED, NON-CONTACT SUPPORT OF A COOLANT FEED LINE FOR SUPERCONDUCTING MACHINES

(75) Inventors: Michael Frank, Uttenreuth (DE); Jörn Grundmann, Grossenseebach (DE); Peter Van Hasselt, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 172 days.

(21) Appl. No.: 13/825,641

(22) PCT Filed: Sep. 20, 2011

(86) PCT No.: PCT/EP2011/066304
§ 371 (c)(1),
(2), (4) Date: Mar. 22, 2013

(87) PCT Pub. No.: WO2012/038416
PCT Pub. Date: Mar. 29, 2012

(65) Prior Publication Data
US 2013/0190184 A1    Jul. 25, 2013

(30) Foreign Application Priority Data
Sep. 24, 2010   (DE) .......................... 10 2010 041 328

(51) Int. Cl.
| | |
|---|---|
| *H01F 6/06* | (2006.01) |
| *H02K 9/00* | (2006.01) |
| *F16C 32/04* | (2006.01) |
| *H02K 9/193* | (2006.01) |
| *H02K 55/04* | (2006.01) |
| *F16L 55/04* | (2006.01) |
| *F16L 59/065* | (2006.01) |

(52) U.S. Cl.
CPC ............ *H02K 9/005* (2013.01); *F16C 32/0436* (2013.01); *F16L 55/04* (2013.01); *F16L 59/065* (2013.01); *H02K 9/193* (2013.01); *H02K 55/04* (2013.01); *F16C 2361/00* (2013.01); *Y02E 40/625* (2013.01)

(58) Field of Classification Search
CPC ............................ H01F 6/065; G01R 33/3815
See application file for complete search history.

(56) References Cited

U.S. PATENT DOCUMENTS

| | | | | |
|---|---|---|---|---|
| 6,118,199 | A | * | 9/2000 | Lembke ........................ 310/90.5 |
| 2005/0155356 | A1 | | 7/2005 | Frank et al. |

FOREIGN PATENT DOCUMENTS

| | | | |
|---|---|---|---|
| DE | 103 58 341 | A1 | 7/2005 |
| DE | 10358341 | * | 7/2005 |

(Continued)

*Primary Examiner* — Colleen Dunn
(74) *Attorney, Agent, or Firm* — Henry M. Feiereisen LLC.

(57) ABSTRACT

A superconducting machine for supporting a coolant feed line for superconducting machines includes a hollow shaft that can be connected to the superconducting machine in a first region, the coolant feed line being disposed in the interior thereof for feeding the coolant from the refrigeration unit to the superconducting machine. A magnetic support is disposed in the first region of the hollow shaft so that a radial and thus motion-damping, centering force is exerted on the coolant feed line. The magnetic support has a first and a second magnetic cylinder, wherein the first magnetic cylinder is disposed on the outer jacket of the coolant feed line and the second magnetic cylinder is disposed on the inner face of the hollow shaft. The first magnetic cylinder is a cylinder made of highly electrically conductive material having ohmic resistance.

20 Claims, 2 Drawing Sheets

(56) References Cited

FOREIGN PATENT DOCUMENTS

| DE | 102 31 434 A1 | 3/2009 |
| GB | 147 1843 | 4/1977 |
| JP | 50109340 A | 8/1975 |
| JP | 4190673 A | 7/1992 |
| JP | 10-281158 A | 10/1998 |
| JP | 2007046695 A | 2/2007 |
| JP | 51025648 A | 10/2009 |
| WO | WO 98/32981 * | 7/1998 |
| WO | WO 98/32981 A1 | 7/1998 |

* cited by examiner

DEVICE AND METHOD FOR DAMPED, NON-CONTACT SUPPORT OF A COOLANT FEED LINE FOR SUPERCONDUCTING MACHINES

CROSS-REFERENCES TO RELATED APPLICATIONS

This application is the U.S. National Stage of International Application No. PCT/EP2011/066304, filed Sep. 20, 2011, which designated the United States and has been published as International Publication No. WO 2012/038416 and which claims the priority of German Patent Application, Serial No. 10 2010 041 328.3, filed Sep. 24, 2010, pursuant to 35 U.S.C. 119(a)-(d).

BACKGROUND OF THE INVENTION

The present invention relates to a device and method for support of a coolant feed line for superconducting machines. In particular the present invention relates to a device for supporting a long coolant feed line. Such a device in accordance with the preamble is known from DE 103 58 341 A1.

Superconducting machines, such as synchronous motors or generators with a superconducting rotor winding for example, have been able to be used commercially since the discovery of high-temperature superconductivity in materials such as YBCO and BiSCO, which exhibit their superconducting effect at an operating temperature of 77K. Such a superconducting machine is known for example from DE 103 58 341 A1.

FIG. 1 shows a possible layout of such a superconducting machine 100 with a cooling unit 200 connected thereto. So that the superconducting machine 100 operates as such, the superconducting winding present in the machine must be cooled down beforehand to its working temperature of 77 K or lower. For this purpose a suitable coolant is introduced into an internal space of the rotor 110 of the machine 100 embodied as a shaft. This internal space of the rotor is connected for this purpose to the cooling unit 200 via corresponding means 300. The cooling unit 200 cannot be connected directly to the machine 100. Instead suitable sealing of the internal rotor space from its surroundings must be ensured, so that no heat leakage or any associated adverse influence on the superconducting effect occurs. In addition a suitable seal must also be provided between the rotor shaft 110 rotating around its axis and the stationary cooling device 200. This is achieved by an appropriately embodied hollow shaft 320. To avoid a leakage of heat this hollow shaft 320 must however be embodied of sufficient length for a given cross-section. Located within the hollow shaft 320 is a coolant feed line 310, which is permanently connected to the cooling unit 200 and feeds the coolant from the cooling unit 200 into the hollow space of the rotor 110. The hollow shaft 320 is permanently connected in this case on one side 320" to the rotating rotor shaft 110. On the other side 320' a suitable sealing device is provided between the rotating hollow shaft 320 and the fixed coolant feed line 310. What are referred to as heating tubes 311 can be provided for example within the coolant feed line 310, which take over the actual transport of the coolant.

Within the hollow shaft 320 the coolant feed line 310 is supported on one side 320' by the sealing device and thus spatially fixed. On the other side, the machine side 320", the coolant feed line 310 is fixed spatially via a magnetic support 400. The magnetic support 400 is based on a superconducting and/or permanent-magnet support. Superconducting supports are very cost-intensive, since superconducting materials are expensive and complex to manufacture. A further disadvantage is the necessary cooling to below the transition temperature of the superconducting material, in order to ensure the operability of the superconducting support. This makes the support susceptible to faults and limits its spatial arrangement in the machine 100. Permanent magnet supports are heavy and are likewise cost-intensive. The weight of the permanent magnets loads the end of the coolant feed line 310 which lies on the machine side 320", and thus acts against the stabilization of the end. To counter the destabilization the coolant feed line 310 and the hollow shaft 320 must be constructed as massive elements. This increases the cost and leads to a deterioration in the machine characteristics.

A machine 100 without a magnetic support 400 on the machine side 320" leads to a freely-movable coolant feed line 310 on the machine side 320" without spatial fixing. The fact that the coolant feed line 310 is only fixed on one side, but is freely movable at the other end of the hollow shaft, means that the coolant feed line 310 can be excited into oscillations. It is precisely with the lengths of the hollow shaft 320 required in superconducting machines that the resonant frequency of the coolant feed line 310 caused by said oscillations can lie in the working range of the rotational frequencies of the machine 100. Accordingly this frequency, as the operating frequency of the machine. must be explicitly excluded. Thus attempts can actually be made, through corresponding constructional measures on the coolant feed line 310, to keep the resonant frequency outside the rotational frequency range of the rotor shaft 110 and thereby outside the permitted working range of the machine 100. This is becoming increasingly more difficult however as a result of the demand for ever smaller sizes of superconducting machine and thus ever thinner hollow shafts with the simultaneous desire for higher speeds.

SUMMARY OF THE INVENTION

The object of the present invention is therefore to specify a corresponding device and method which, even with small sizes and higher speeds, avoids the permitted operating range of the superconducting machine being restricted by the resonant frequency of the coolant feed line, wherein supports with heavy permanent magnets on the coolant feed line or expensive superconductors are to be dispensed with.

According to one aspect of the invention, the object is achieved by a device for supporting a coolant feed line, especially longer coolant feed lines for superconducting machines, including a hollow shaft (320), which is able to be connected in a first area with the superconducting machine and inside which the coolant feed line for feeding coolant from a cooling unit to the superconducting machine is disposed. In this case the coolant feed line is able to be connected to the cooling unit in a second area of the hollow shaft and is fixed in this hollow shaft. For the coolant feed line in the first area of the hollow shaft a magnetic support is provided and is disposed so that a radial, and thereby damping and/or centering force, is exerted on the coolant feed line. The magnetic support has a first and a second magnetic cylinder, with the first magnetic cylinder being disposed on the outer jacket of the coolant feed line and the second magnetic cylinder on the inner side of the hollow shaft so that first and second magnetic cylinder are located opposite one another in a radial direction. The first magnetic cylinder is a cylinder made from material with good electrical conductivity with ohmic resistance.

According to another aspect of the invention, the object is achieved by a method for the use of the aforementioned device, whereby the coolant feed line is damped against mechanical movements relative to the hollow shaft.

Advantageous embodiments of the inventive device and of the inventive method for supporting a coolant feed line emerge from the respective assigned dependent subclaims. In such cases the features of the main claim can be combined with features of the subclaims and features of the subclaims can be combined with one another.

The basis of the invention was the premise that a damping of the movement or oscillation of the coolant feed line is sufficient in order to provide a machine operable over the long-term. Centering with large forces and thus with a strong fixing of the coolant feed line via pure permanent magnet supports or magnetic supports with superconducting material can be dispensed with. Movement-induced eddy currents in material with good electrical conductivity with ohmic resistance, i.e. non-superconducting material, are sufficient to guarantee a sufficiently large damping of oscillations of a free end of a coolant feed line. A reliable function without destruction of the machine through oscillations of an end of the coolant feed line is permanently assured in this way.

The material with good electrical conductivity can consist of copper, silver, gold or aluminum. Aluminum for example only has a light weight and therefore leads to favorable characteristics of the machine. Since only thin layers of the material with good electrical conductivity are necessary, said layers can be manufactured simply and at low cost.

The material with good electrical conductivity can consist of highly-pure copper, silver, gold or aluminum with a degree of purity of greater than 99.9% by volume. These materials are readily procurable commercially and make possible high electrical conductivity at cryogenic temperatures. Thus the material with good electrical conductivity, at cryogenic temperatures, especially at temperatures of less than or equal to 77° K, can exhibit a specific electrical resistance of less than $100\,\mu\Omega cm^2/m$, especially less than $10\,\mu\Omega cm^2/m$. This means that very thin layers, ranging from millimeters to micrometers, are sufficient for creating eddy currents for a good damping during movement of the coolant feed line. The low additional weight of the material with good electrical conductivity on the especially thin-walled coolant feed line enables gravity-induced bending of the coolant feed line to be kept within tolerable limits.

The second magnetic cylinder can consist of a number of concentric permanent magnet rings disposed axially next to one another. The permanent magnet rings on the second magnetic cylinder do not lead to any mechanical load on the coolant feed pipe, whereby the previously described advantages are retained. Through the permanent magnets eddy currents can be created easily and without electrical effort, as is necessary in the case of magnetic field creation by electrical coils, in the material with good electrical conductivity, by movement of the permanent magnets relative to the layer of material with good electrical conductivity. Via the eddy currents a damping of the movement is achieved, as previously described, with the desired advantages.

A second cylinder made of ferromagnetic material can be disposed between the inner side of the hollow shaft and the concentric permanent magnet rings. As an alternative or in addition, permanent rings lying next to one another in an axial direction can be separated from one another in each case by a ring of ferromagnetic material. The effect of the ferromagnetic material is that there is an increased effect of the magnetic field of the permanent magnets on the layer of material with good electrical conductivity and thus an increased movement damping.

The inventive method for using a previously described device comprises the coolant feed line being damped against mechanical movements relative to the hollow shaft. The mechanical movement can be damped by movement-induced eddy currents in the electrically-conductive material of the first magnetic cylinder. The method and the device can be used in a superconducting machine.

The advantages associated with the method for supporting a coolant feed line and the use of the method and the device for supporting a coolant feed line are similar to the advantages which have been described previously in relation to the device itself.

The fact that the coolant feed line is supported at one end by the magnetic support and at the other end by the already existing sealing device in the hollow shaft means that a fixing of the coolant feed line in the hollow shaft on both sides is achieved. This shifts the resonant frequency of the coolant feed line to much higher frequencies and thus away from the operating range of the superconducting machine. It is precisely with long hollow shafts and thereby long coolant feed lines, as are demanded for a superconducting machine, that a restriction of the permissible working range of this machine can be avoided. Since the magnetic support is provided preferably at the end of the hollow shaft which is connected to the rotor shaft or even in the rotor hole itself, into which the coolant feed line actually also protrudes, the magnetic support is located very close to the rotor with the coolant contained therein and thus in an area with very low temperatures. At such temperatures around 77° K or lower however only magnetic supports are currently able to be used. In addition the magnetic supports have the advantage that, by contrast with conventional mechanical supports, they exhibit lower losses. The cryogenic temperatures which are produced in the spatial area of the support as a result of the structure of the machine can be used simultaneously, in order to achieve, via a good conductivity in the highly-pure material with good electrical conductivity, a good movement damping, whereby material with less good electrical conductivity must be used. Material with less good electrical conductivity is synonymous with less weight load and possible bending of the coolant feed line.

By embodying the magnetic support from a first magnetic cylinder disposed on the outer jacket of the coolant feed line and a second magnetic cylinder disposed on the inner side of the hollow shaft, which are both opposite one another in the radial direction, a simple fitting of the coolant feed line continues to be possible. The gap present between the two magnetic cylinders does not result in any mechanical restrictions during installation. Instead the coolant feed line can be introduced as previously without any greater problems into the hollow shaft and thus the cooling unit can be connected to the superconducting machine.

Since the magnetic support is located in the same hollow space as the coolant for the rotor shaft of the superconducting machine, the superconducting magnetic cylinder can also be cooled down by the coolant to a temperature of 77° K or less. However the use of material with good electrical conductivity with ohmic resistance instead of the use of superconducting material means that the magnetic support effect and thereby the damping the movement of the coolant feed line by the magnetic support is not just reached at an operating temperature of lower than or equal to 77° K. This increases the reliability of the effect of the magnetic support even in the event of a failure of the cooling device.

BRIEF DESCRIPTION OF THE DRAWING

Preferred embodiments of the invention with advantageous developments in accordance with the features of the dependent claims are explained in greater detail below with reference to the figures, without however being restricted to said figures.

The figures show in.

DETAILED DESCRIPTION OF PREFERRED EMBODIMENTS

Figure 1:
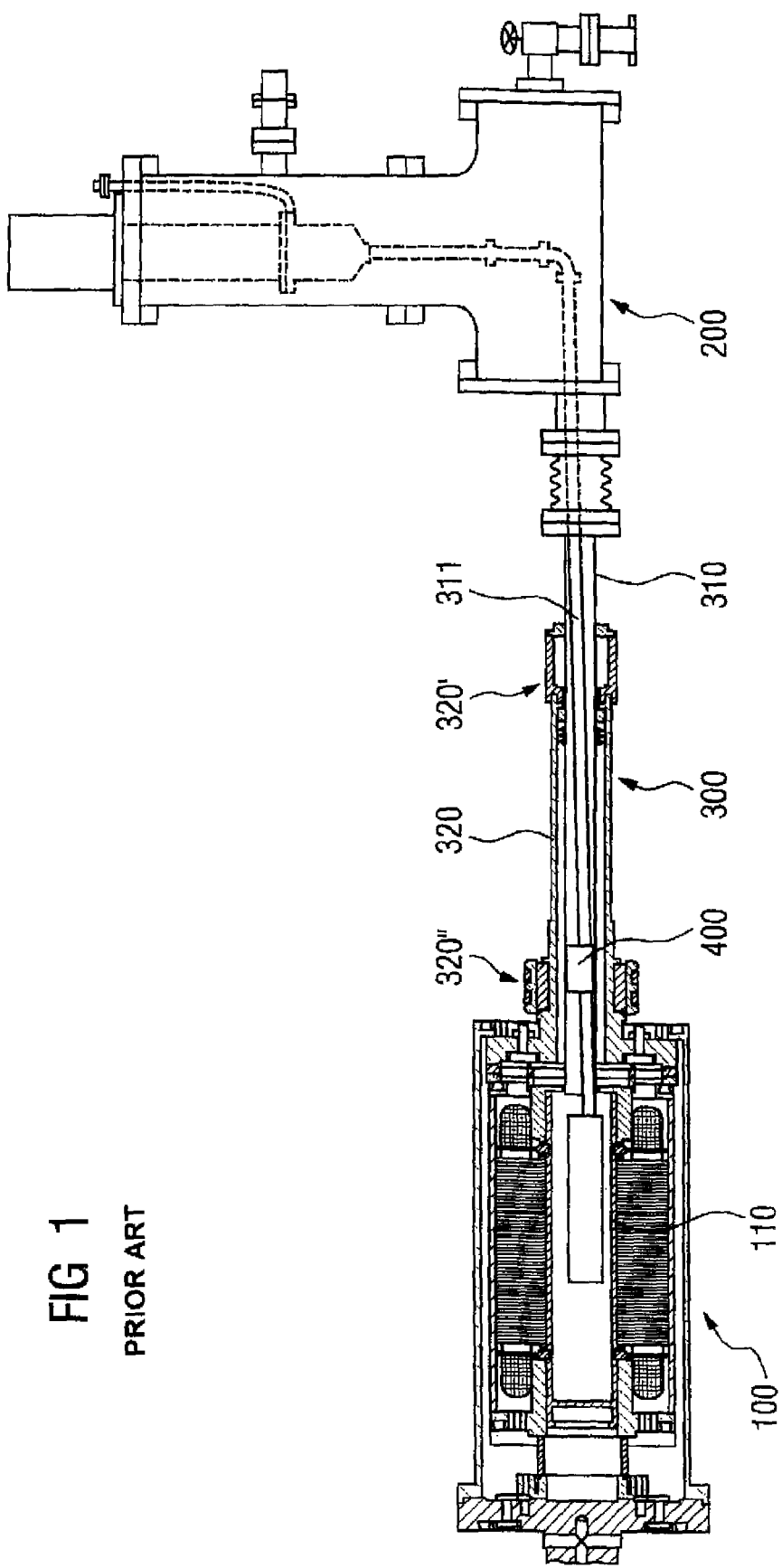
FIG. 1 an arrangement of superconducting machine with connected cooling device in accordance with the prior art, and FIG. 2 a first embodiment of the magnetic support of the inventive device with a cylinder of material with good electrical conductivity having ohmic resistance, and FIG. 3 a second embodiment of the magnetic support of the inventive device similar to the device depicted in FIG. 2, with slight constructional changes.

FIG. 1 once again shows the basic structure of a superconducting machine 100 with cooling unit 200 described at the start with reference to the prior art. The machine, in the present example a synchronous motor 100, is connected to the cooling unit 205 via the means 300, that is especially the hollow shaft 320 and the coolant feed line 310. In the cooling unit the coolant is cooled down to 77 K and fed to the rotor shaft 110 of the synchronous motor 100 via the coolant feed line 310. To avoid a heat leakage at the synchronous motor 100 the hollow shaft 320 is embodied correspondingly long. The hollow shaft is permanently connected to the rotor shaft 110 on one side, i.e. in the area 320", so that this shaft turns at the same speed as the rotor 110 during operation of the synchronous machine. The coolant feed line 310 is disposed in the hollow shaft 320. At the end facing away from the synchronous motor 100, i.e. the area 320', of the hollow shaft 320 a sealing device, which is embodied for example as a ferrofluid seal, labyrinth seal or gap seal, is provided. This seal device seals the inner space volume of the rotor 110 and the hollow shaft connected therewith 320 from their surroundings. In addition the coolant feed line 310 is routed through this sealing device and thus supported and fixed. Outside the hollow shaft 320 the coolant feed line 310 is then connected in a suitable manner, for example by a flange connection, to the cooling unit 200. The coolant can now move from the cooling unit 200 into the interior of the rotor shaft 110, and vice versa, via one or more so-called heating tubes 311 in the coolant feed line 310. A more detailed description of the embodiment of mode of operation of the superconducting machine, the cooling unit and the hollow shaft will not be provided here. Instead the reader is referred to DE 102 31 434 A1.

As shown in FIG. 1, in accordance with the prior art, a magnetic support 400 is now provided at the end 320" of the hollow shaft 320 facing towards the machine and is disposed so that a radially repelling and thus centering force is exerted on the coolant feed line 310. The prior art magnetic support 400 is based entirely on permanent magnets interacting with superconducting material. Through this magnetic support 400 and the bearing in the sealing device the coolant feed line 310, previously only supported on one side, is now supported and fixed on both sides in the hollow shaft 320. The result achieved by the extra fixing is that the freely floating and thus oscillatable end of the coolant feed line 310 is now fixed and thus the resonant frequency of the coolant fed line is shifted into higher frequency ranges. In this case the precise position of the magnetic support 400 in the hollow shaft 320 is only of importance in the prior art to the extent that the magnetic support must be disposed so that, through the two-sides fixed of the coolant feed line 310, a shift of its resonant frequency away from the working range of the superconducting machine 100 is achieved and a cryogenic temperature is present when superconducting material is used. Preferably the magnetic support 400 in this case is provided at the end of the hollow shaft, for example on a flange between hollow shaft and rotor shaft, or also in the rotor shaft itself.

The magnetic support 400 includes a first 410 and a second 420 magnetic cylinder, wherein the first magnetic cylinder 410 is disposed on the outer jacket of the coolant feed line 310 and the second magnetic cylinder 420 is disposed on the inner side of the hollow shaft 320. Both magnetic cylinders 410 and 420 are disposed in such cases so that they are opposite one another in the radial direction. In such cases the dimensions of the two magnetic cylinders 410 and 420 are selected so that there is still a gap present between the first outer surface of the first magnetic cylinder 410 and the inner surface of the second magnetic cylinder 420. The two magnetic cylinders 410, 420 are aligned with their magnetic fields such that they exert forces which repel each other in the gap. Through these repelling forces the coolant feed line 310 together with the first magnetic cylinder 410, is put into a floating state in the free inner space of the second magnetic cylinder and is centered by the repelling forces brought about in this inner space. As a result the coolant feed line 310 is now fixed on both sides in the hollow shaft 320, through which the resonant frequency of the coolant feed line 310 is shifted to higher frequencies and thus away from the rotational frequency range of the motor 100.

As already described previously, when superconducting material is used in the magnetic support 400, the support 400 must be disposed in a spatial area which is cooled to cryogenic temperatures, wherein the support 400 is not functioning when the cooling fails or is switched off. This can lead, especially with faults at the cooling unit 200, to irreversible deformations right through to destruction of the machine 100 and/or the coolant feed line 310. When magnetic supports 400 made purely of permanent magnets are used, the relatively large weight of the permanent magnets can lead to a deformation of the coolant feed line 310. In order to avoid this, additional material needs to be used, which is cost-intensive and can lead to a deterioration of the characteristics of the machine 100 during operation.

In order to avoid the problems in the prior art the knowledge that a damping of movements for mechanical oscillations of the coolant feed line 310 is sufficient to avoid damage to the machine 100 and/or the coolant feed line 310, has led to the inventive idea of using neither superconducting materials nor permanent magnets for support on the coolant feed line 310 side. A weight reduction and more reliable movement damping even at higher temperatures than cryogenic temperatures leads to an improvement in the machine characteristics during operation and also to a reduction in the susceptibility to faults of the machine 100 in connection with the cooling unit 200.

Figure 2:
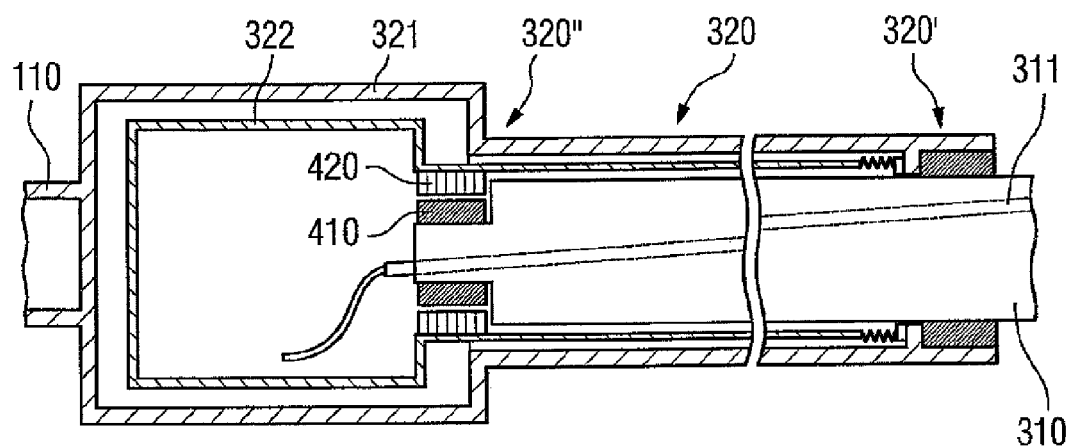

FIG. 2 shows a first embodiment of the inventive device for supporting a coolant feed line, in which the first magnetic cylinder 410 is a cylinder made from material with good electrical conductivity with ohmic resistance. The hollow shaft 320 includes here of an outer jacket 321, for example an NDE hollow shaft and an inner jacket 322. In this case an insulating vacuum is located between the outer and the inner jacket. The coolant feed line 310 introduced from outside through the sealing device at the end 320' of the hollow shaft 320 is located in the inner jacket 322. The coolant is brought into the area 320" of the hollow shaft and bus also into the rotor shaft 110 connected to it via a heating tube 311. A sealing device made of ferrofluid supports the coolant feed line 310 in the area 320' of the hollow shaft 320. On the side

320" of the hollow shaft 320 facing away therefrom, in accordance with the invention the magnetic support 400 with a cylinder on the outer circumference of the coolant feed line 310 is provided, which is made of material with good electrical conductivity with ohmic resistance. In the axial direction at the same point on the inner side of the hollow shaft 320 a number of permanent magnet rings are disposed axially next to one another. This number of magnetic rings then forms the second magnetic cylinder 420, which in its free inner space makes possible a movement of the first cylinder 410 made from material with good electrical conductivity with ohmic resistance. The movement of the first cylinder 410 in the second cylinder 420 is possible without contact within certain limits, through which there is no direct, radiation-free heat conductivity between coolant feed line 310 and hollow shaft 320 or rotor shaft 110.

During movement or mechanical oscillation of the coolant feed line 310 relative to the hollow shaft 320 on the side 320", eddy currents are created by the spatially changing magnetic field of the permanent magnets of the first magnetic cylinder 410 for example at the location of the second magnetic cylinder 420 made of the material with good electrical conductivity with ohmic resistance in the material with good electrical conductivity with ohmic resistance, of which the magnetic field, in interaction with the magnetic field of the first magnetic cylinder 410, leads to a damping of the movement or mechanical oscillation. A fixing or support with larger magnetic fields by permanent magnets on both sides, both in the first and also in the second magnetic cylinder or through the use of superconducting material in the support 400 is not necessary in order to achieve a sufficient damping of the movement or mechanical oscillation. The eddy currents and their magnetic fields in the material with good electrical conductivity with ohmic resistance are sufficient to achieve a sufficient damping of the movement or mechanical oscillations of the coolant feed line 310, which then prevents irreversible mechanical damage.

If the operating temperature of 77° K or lower is reached, the superconducting machine 100 the cylinder 410 also becomes very highly conductive since the ohmic resistance for its pure metals reduces greatly with the temperature to low values at low temperatures. Thus at operating temperature a coolant feed line 310 previously fixed, i.e. tensioned, on one side becomes an arrangement fixed on two sides, of which the movements on the side 320" are strongly damped. In operation the hollow shaft 320 and thus also the superconducting second magnetic cylinder 420 rotates around the fixed coolant feed line 310 and the first magnetic cylinder 410 arranged thereon. The resulting forces acting through the magnetic fields of the two magnetic cylinders 410 and 420 in the radial direction lead to the coolant feed line 310 also being damped at this end 320" of the hollow shaft 320 against movements.

Figure 3:
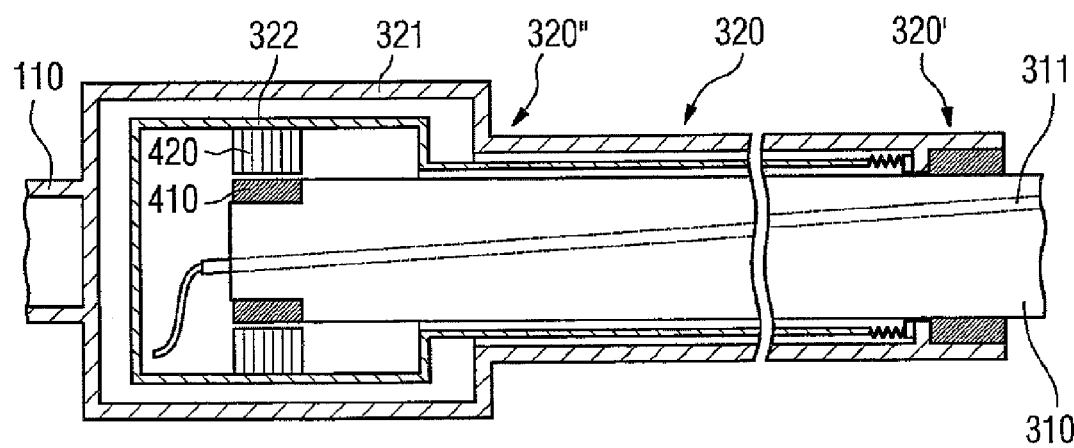

In the exemplary embodiment shown in FIG. 3 the magnetic support 400, which is constructed identically to the magnetic support shown in FIG. 2 from a first magnetic cylinder 410 made of material with good electrical conductivity with ohmic resistance and a second magnetic cylinder 420 with a number of permanent magnet rings 410, is disposed at a point in area 320" of the hollow shaft 320 which is embodied as a so-called neck tube flange.

The two exemplary embodiments shown in FIGS. 2 and 3 of a magnetic support 400 have the particular advantage that the installation of the cooling unit 200 and the coolant feed line 310 on the superconducting machine 100 is not significantly influenced by the additional magnetic support 400. Since the support between the two cylinders 410 and 420 can be selected relatively large, the introduction of the coolant feed line 310 into the hollow shaft 320 is unproblematic even in the inventive device. To improve the support effect however smaller support gaps can also be selected.

Between the individual permanent magnet rings ferromagnetic disks for flux guidance can be introduced. The individual permanent magnet rings are preferably made of Nd—B—Fe or Sm—Co. Additional thin sheets of ferromagnetic material, not shown in FIG. 2, can be inserted between these disks and the permanent magnet rings. With the arrangements shown in FIGS. 2 and 3, for an optimal effect of the magnetic support 400, the air gap should have a height which is approximately 0.1-0.3 times the length L of the individual permanent magnet rings in the axial direction. Thee radial thickness of the magnetic cylinder should approximately correspond to the value (L/2 to 4×L). In a typical application for a superconducting machine, such as a superconducting motor or generator for example, the diameter of the coolant feed line 310 should have a value of 1-3 cm. Accordingly the permanent magnet rings will have a width of around 0.4-1 cm and a radial thickness of 0.2-2.5 cm. The ferromagnetic disks should have a thickness of 1-4 mm and the air gap between the fixed first cylinder 410 and the rotating second magnetic cylinder 420 should have a height of 0.7-2.5 mm.

Even if reference is made for the first cylinder 410 to a magnetic cylinder, this does not mean that the cylinder is permanently magnetic, but that magnetic fields are created by created eddy currents during movement relative to the second magnetic cylinder 420, which counteract the movement, i.e. damp it out. Thus the term supporting or support 400 is to be understood as a damping device, which counteracts a spatial relative movement of the coolant feed line 310 and rotations in relation to the machine 100 but does not completely suppress these. Instead mechanical oscillations of the coolant feed line 310 occurring on the side 320" of the hollow shaft are damped in relation to the hollow shaft and cannot lead in the event of resonance to an irreversible destruction.

The second magnetic cylinder 420, as an alternative to being constructed from permanent magnets, can also comprise coils or conductor loops through which current flows, or other devices creating a magnetic field. The exemplary embodiments of the device for supporting a coolant feed line shown in FIGS. 2 and 3 are not intended to restrict the invention but can also be combined with one another and/or with other exemplary embodiments not shown.

The invention claimed is:

1. A device for supporting a coolant feed line for a superconducting machine, comprising:
    a hollow shaft having a first area for connection to the superconducting machine and a second area for connection to a cooling unit, said hollow shaft having an interior for accommodating a coolant feed line for feeding coolant from the cooling unit to the superconducting machine, said coolant feed line being fixed in the second area of the hollow shaft; and
    a magnetic support arranged in the first area of the hollow shaft for exerting a radial force on the coolant feed line to effect damping or centering, said magnetic support having first and second magnetic cylinders, said first magnetic cylinder disposed on an outer jacket of the coolant feed line and made of a material with good electrical conductivity with ohmic resistance, and said second magnetic cylinder disposed on an inner side of the hollow shaft so that the first and second magnetic cylinders lie opposite one another in a radial direction.

2. The device of claim 1, wherein the material is selected from the group consisting of copper, silver, gold, and aluminum.

3. The device of claim 1, wherein the material is selected from the group consisting of highly-pure copper, silver, gold, and aluminum with a degree of purity greater than 99.9 percent by volume.

4. The device of claim 1, wherein the material has a specific electrical resistance of less than 100 $\mu\Omega cm^2/m$ at a cryogenic temperature.

5. The device of claim 4, wherein the cryogenic temperature is less than or equal to 77° K.

6. The device of claim 1, wherein the material has a specific electrical resistance of less than 10 $\mu\Omega cm^2/m$ at a cryogenic temperature.

7. The device of claim 1, wherein the second magnetic cylinder includes a plurality of concentric permanent magnet rings disposed axially next to one another.

8. The device of claim 7, further comprising a further cylinder made of ferromagnetic material disposed between the inner side of the hollow shaft and the concentric permanent magnet rings.

9. The device of claim 7, further comprising rings made of ferromagnetic material and disposed between axially adjacent ones of the permanent magnet rings so as to separate the permanent magnet rings from one another.

10. A method, comprising:
   connecting a first area of a hollow shaft to a superconducting machine and a second area of the hollow shaft to a cooling unit;
   feeding coolant through a coolant feed line inside the hollow shaft to the superconducting machine; and
   damping a mechanical movement of the coolant feed line relative to the hollow shaft by providing a magnetic support in the first area of the hollow shaft for exerting a radial force on the coolant feed line and forming the magnetic support of a first magnetic cylinder disposed on an outer jacket of the coolant feed line and made of a material with good electrical conductivity with ohmic resistance and a second magnetic cylinder disposed on an inner side of the hollow shaft so that the first and second magnetic cylinders lie opposite one another in a radial direction.

11. The method of claim 10, wherein the mechanical movement is damped by movement-induced eddy currents in the electrically-conductive material of the first magnetic cylinder disposed on an outer jacket of the coolant feed line.

12. A superconducting machine, comprising device for supporting a coolant feed line for a superconducting machine, said device comprising a hollow shaft having a first area for connection to the superconducting machine and a second area for connection to a cooling unit, said hollow shaft having an interior for accommodating a coolant feed line for feeding coolant from the cooling unit to the superconducting machine, said coolant feed line being fixed in the second area of the hollow shaft, and a magnetic support arranged in the first area of the hollow shaft for exerting a radial force on the coolant feed line to effect damping or centering, said magnetic support having first and second magnetic cylinders, said first magnetic cylinder disposed on an outer jacket of the coolant feed line and made of a material with good electrical conductivity with ohmic resistance, and said second magnetic cylinder disposed on an inner side of the hollow shaft so that the first and second magnetic cylinders lie opposite one another in a radial direction.

13. The superconducting machine of claim 12, wherein the material is selected from the group consisting of copper, silver, gold, and aluminum.

14. The superconducting machine of claim 12, wherein the material is selected from the group consisting of highly-pure copper, silver, gold, and aluminum with a degree of purity greater than 99.9 percent by volume.

15. The superconducting machine of claim 12, wherein the material has a specific electrical resistance of less than 100 $\mu\Omega cm^2/m$ at a cryogenic temperature.

16. The superconducting machine of claim 15, wherein the cryogenic temperature is less than or equal to 77° K.

17. The superconducting machine of claim 12, wherein the material has a specific electrical resistance of less than 10 $\mu\Omega cm^2/m$ at a cryogenic temperature.

18. The superconducting machine of claim 12, wherein the second magnetic cylinder includes a plurality of concentric permanent magnet rings disposed axially next to one another.

19. The superconducting machine of claim 18, wherein the device includes a further cylinder made of ferromagnetic material disposed between the inner side of the hollow shaft and the concentric permanent magnet rings.

20. The superconducting machine of claim 18, further comprising rings made of ferromagnetic material and disposed between axially adjacent ones of the permanent magnet rings so as to separate the permanent magnets from one another.

* * * * *